US012801005B2

(12) United States Patent
Huang et al.

(10) Patent No.: US 12,801,005 B2
(45) Date of Patent: Nov. 17, 2026

(54) OPTICAL ENGINE MODULE AND PROJECTION DEVICE

(71) Applicant: Coretronic Corporation, Hsin-Chu (TW)

(72) Inventors: Chin-Wen Huang, Hsin-Chu (TW); Ming-Chen Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 269 days.

(21) Appl. No.: 18/617,537

(22) Filed: Mar. 26, 2024

(65) Prior Publication Data

US 2024/0329509 A1 Oct. 3, 2024

(30) Foreign Application Priority Data

Mar. 30, 2023 (CN) ......................... 202310328197.0

(51) Int. Cl.

| | |
|---|---|
| ***G03B 21/00*** | (2006.01) |
| ***G03B 21/28*** | (2006.01) |
| ***H04N 9/31*** | (2006.01) |

(52) U.S. Cl.

CPC .................................... *G03B 21/28* (2013.01)

(58) Field of Classification Search

CPC .. G03B 21/008; G03B 21/28; G03B 21/2066; H04N 9/3102; H04N 9/3105; H04N 9/3108

USPC ........................................................... 353/97

See application file for complete search history.

(56) References Cited

U.S. PATENT DOCUMENTS

| | | | | |
|---|---|---|---|---|
| 11,256,164 | B2 | 2/2022 | Fu et al. | |
| 2005/0146689 | A1 * | 7/2005 | Iechika ................ | G03B 21/208 348/E9.027 |
| 2021/0124245 | A1 * | 4/2021 | Tsai ..................... | G03B 21/008 |

FOREIGN PATENT DOCUMENTS

| | | |
|---|---|---|
| CN | 1650227 | 8/2005 |

* cited by examiner

*Primary Examiner* — Ryan D Howard

(74) *Attorney, Agent, or Firm* — JCIPRNET

(57) ABSTRACT

An optical engine module, including a prism set and a light valve, and absorption layer, is provided. The prism set has a first surface. The light valve is disposed on a side of the first surface of the prism set. The light valve includes a protection case and an optical surface. The protection case includes a first opening, and the optical surface is exposed from the first opening. The absorption layer is disposed on the first surface of the prism set. The absorption layer includes a second opening, wherein an area of the second opening is less than an area of the first opening.

11 Claims, 9 Drawing Sheets

OPTICAL ENGINE MODULE AND PROJECTION DEVICE

CROSS-REFERENCE TO RELATED APPLICATION

This application claims the priority benefit of China application serial no. 202310328197.0, filed on Mar. 30, 2023. The entirety of the above-mentioned patent application is hereby incorporated by reference herein and made a part of this specification.

BACKGROUND

Technical Field

The disclosure relates to an optical module and an electronic device, and in particular to an optical engine module and a projection device.

Description of Related Art

The projection device is a display device for generating large-size images and has been constantly improving with the evolution and innovation of technology.

In the current optical engine module of the projection device, the outside of the light valve packaging region of the optical engine module is made of a non-extinction material, and the reflected light in the outside region causes light leakage in the contour of a dark image. In order to solve the issue, the current approach is to add a light shielding mask (also referred to as a digital micromirror device (DMD) mask) with a light transmitting region in front of the light valve to effectively reduce light leakage in a dark image. However, in such method, a part of the light beam is still be reflected by the inner wall of the light transmitting region of the light shielding mask or the light beam is reflected by the surface of the prism and then reflected by the surface of the light shielding mask to cause light leakage, thereby affecting the image quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides an optical engine module, which includes a prism set and a light valve, and an absorption layer. The prism set has a first surface. The light valve is disposed on a side of the first surface of the prism set. The light valve includes a protection case and an optical surface. The protection case includes a first opening, and the optical surface is exposed from the first opening. The absorption layer is disposed on the first surface of the prism set. The absorption layer includes a second opening. An area of the second opening is less than an area of the first opening.

The disclosure also provides a projection device, which includes an illumination system, an optical engine module, and a projection lens. The illumination system is used to provide an illumination beam. The optical engine module is disposed on a transmission path of the illumination beam and is used to convert the illumination beam into an image beam. The optical engine module includes a prism set, a light valve, and an absorption layer. The prism set has a first surface. The light valve is disposed on a side of the first surface of the prism set. The light valve includes a protection case and an optical surface. The protection case includes a first opening, and the optical surface is exposed from the first opening. The absorption layer is disposed on the first surface of the prism set. The absorption layer includes a second opening. An area of the second opening is less than an area of the first opening. The projection lens is disposed on a transmission path of the image beam and is used to project the image beam out of the projection device.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as “top”, “bottom”, “front”, “back”, etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof, and additional items. Unless limited otherwise, the terms "connected", "coupled", and "mounted" and variations thereof herein are used broadly and encompass direct and indirect connections, couplings, and mountings. Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The disclosure provides an optical engine module and a projection device, which can improve optical quality.

Other purposes and advantages of the disclosure can be further understood from the technical features disclosed in the disclosure.

Figure 1:
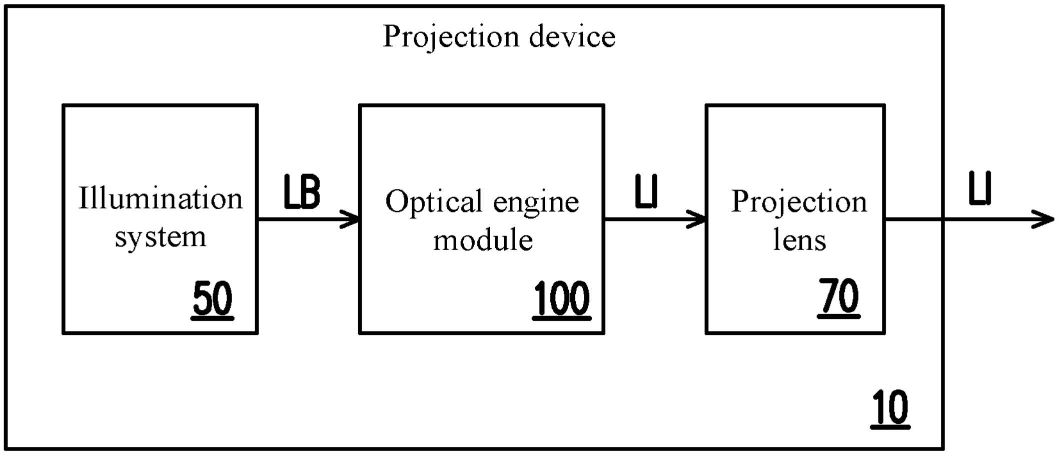
FIG. 1 is a schematic diagram of a projection device according to an embodiment of the disclosure.

FIG. 1 is a schematic diagram of a projection device according to an embodiment of the disclosure. Please refer to FIG. 1. The embodiment provides a projection device 10, which includes an illumination system 50, an optical engine module 100, and a projection lens 70. The illumination system 50 is used to provide an illumination beam LB. The optical engine module 100 is disposed on a transmission path of the illumination beam LB and is used to convert the illumination beam LB into an image beam LI. The projection lens 70 is disposed on a transmission path of the image beam LI and is used to project the image beam LI out of the projection device 10, for example, onto a projection target (not shown, such as a screen or a wall).

In the embodiment, the illumination system 50 is, for example, composed of multiple light emitting elements, a wavelength conversion element, a light homogenizing element, a filter element, and multiple light splitting/combining elements, and is used to provide light with different wavelengths in different time interval or at the same time to form the illumination beam LB. The light emitting elements are, for example, light emitting diodes (LED) or laser diodes (LD). However, the disclosure does not limit the type or the form of the illumination system 50 in the projection device 10, and sufficient teachings, suggestions, and implementation explanations of the detailed structure and implementation thereof may be obtained from common knowledge in the art, so details are not repeated here.

The projection lens 70 includes, for example, an aperture and a combination of one or more optical lens elements with diopters, such as various combinations of non-planar lens elements such as biconcave lens, biconvex lens, concave-convex lens, convex-concave lens, plano-convex, and plano-concave lens. In an embodiment, the projection lens 70 may also include a planar or concave optical lens element to project the image beam LI from the optical engine module 100 to the projection target in a reflective manner. The disclosure does not limit the form and the type of the projection lens 70.

Figure 2:
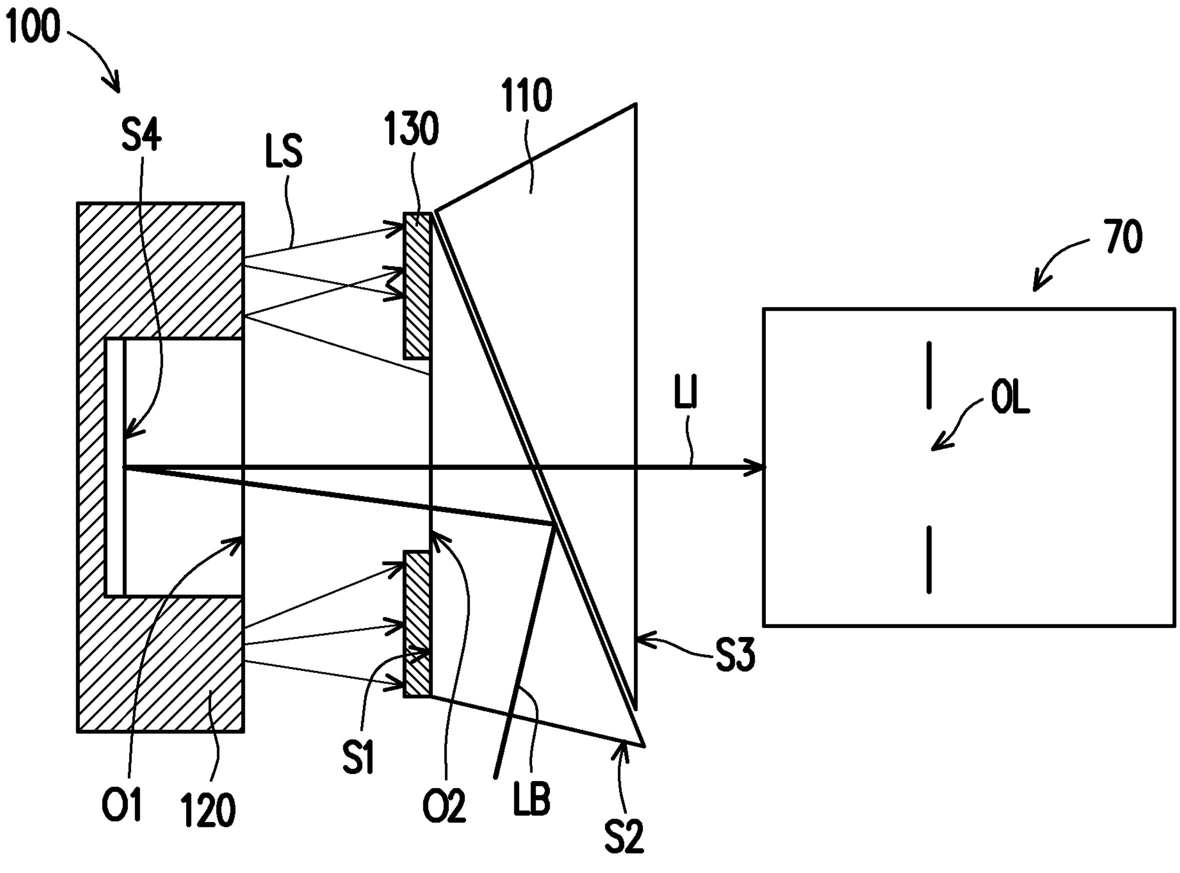
FIG. 2 is a schematic diagram of an optical engine module according to an embodiment of the disclosure.
Figure 3A:
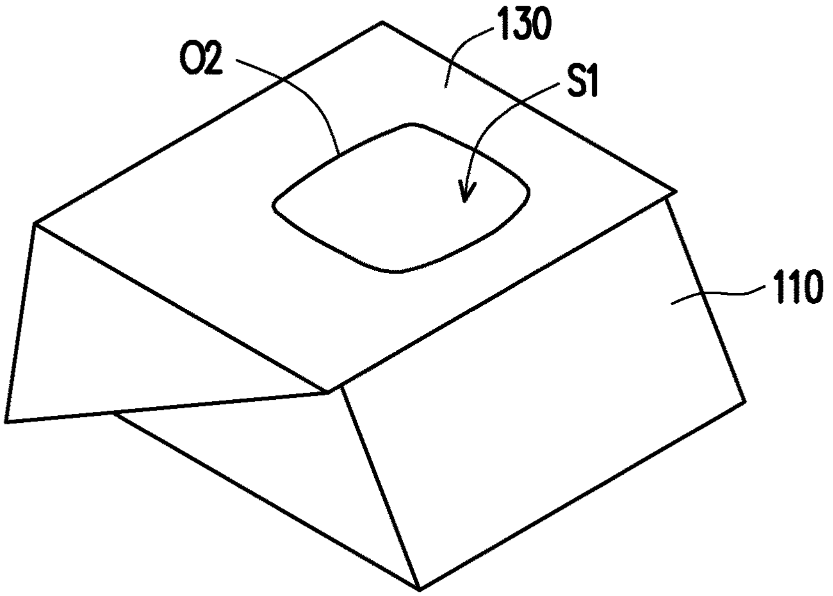
FIG. 3A is a three-dimensional schematic diagram of the optical engine module of FIG. 2.

FIG. 2 is a schematic diagram of an optical engine module according to an embodiment of the disclosure. FIG. 3A is a three-dimensional schematic diagram of the optical engine module of FIG. 2. Please refer to FIG. 1 to FIG. 3A. The optical engine module 100 of the embodiment may be at least applied to the embodiment of FIG. 1, which will be described below as an example. The optical engine module 100 is, for example, composed of multiple prism elements, at least one light valve, and multiple different types of optical elements, and is used to receive the illumination beam LB provided by the illumination system 50. In the embodiment, the optical engine module 100 includes a prism set 110, a light valve 120, and an absorption layer 130. The prism set 110 has a first surface S1, and the light valve 120 is disposed on a side of the first surface S1 of the prism set 110. The prism set 110 is, for example, a total internal reflection (TIR) prism and includes two prism elements, but the disclosure is not limited thereto. A surface that is not expected to be passed through by the illumination beam LB and the image beam IB may be coated with black paint, and the disclosure is not limited thereto. Furthermore, the prism set 110 also has a second surface S2 and a third surface S3. The illumination beam LB from the illumination system 50 enters the prism set 110 from the second surface S2, and leaves the prism set 110 from the first surface S1. The image beam LI from the light valve 120 enters the prism set 110 from the first surface S1, and leaves the prism set 110 from the third surface S3. In the embodiment, the first surface S1 and the second surface S2 are, for example, located on the same prism element, and the third surface S3 is, for example, located on the other prism element.

Please refer to FIG. 2. The light valve 120 includes a protection case 122 and an optical surface S4. The optical surface S4 is, for example, a reflection surface of the light valve for reflecting the illumination beam LB, the protection case 122 includes a first opening O1, and the optical surface S4 is completely exposed from the first opening O1. The light valve 120 is, for example, a reflective optical modulator, such as a liquid crystal on silicon (LCoS) panel and a digital micromirror device (DMD). In other embodiments, the light valve 120 may also be a transmissive optical modulator, such as a transparent liquid crystal panel, an electro-optical modulator, a magneto-optical modulator, and an acousto-optical modulator (AOM). The disclosure does not limit the form and the type of the light valve 120.

The absorption layer 130 is disposed on the first surface S1 of the prism set 110 at a spacing from the light valve 120 (for example, the absorption layer 130 does not contact the light valve 120). The absorption layer 130 is, for example, a black film layer formed on the first surface S1 of the prism set 110 by sputtering, coating, or other manners. For example, the absorption layer 130 may be made of chromium (Cr) or a chromium compound with high light absorption rate, temperature resistance over 180 degrees Celsius, and strong adhesion to the surface of the prism set 110. The absorption layer 130 includes a second opening O2, wherein the area of the second opening O2 is less than the area of the first opening O1. The illumination beam LB is transmitted into the prism set 110 by the illumination system 50, and is reflected (for example, total internal reflection) by the prism set 110 to be transmitted through the first opening O1 of the light valve 120 and transmitted to the optical surface S4. The light valve 120 converts the illumination beam LB into the image beam LI. The image beam LI passes through the first opening O1 of the light valve 120, and is transmitted through the second opening O2 of the absorption layer 130 to enter the prism set 110. The projection lens 70 has an aperture opening OL, which is suitable for controlling the amount of light incident on the projection lens 70. For example, the aperture disposed inside the projection lens 70 has the aperture opening OL. After the image beam LI from the prism set 110 enters the projection lens 70, the image beam LI may pass through the aperture opening OL. Therefore, the image beam LI from the light valve 120 can only be transmitted through the second opening O2 of the absorption layer 130, and a stray light LS reflected by other surfaces of the prism set 110 and the protection case 122 of the light valve 120 are absorbed by the absorption layer 130 to achieve a light shielding effect. In this way, the display effect of an image can be greatly improved to enhance the optical quality.

Figure 3B:
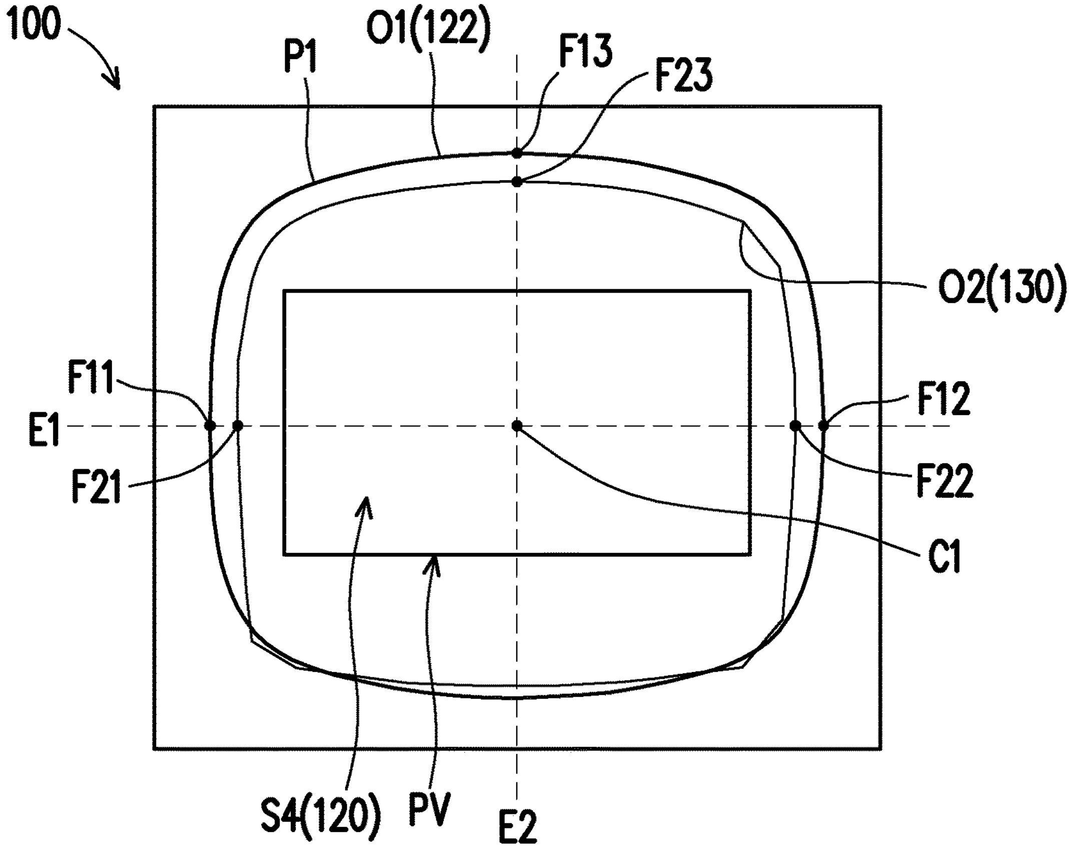
FIG. 3B is a schematic diagram of a projection of the optical engine module of FIG. 2 on a first surface.

FIG. 3B is a schematic diagram of a projection of the optical engine module of FIG. 2 on a first surface. Please refer to FIG. 2 to FIG. 3B. In detail, in the embodiment, an orthographic projection region of the optical surface S4 of the light valve 120 on the first surface S1 is a light valve projection region PV. The light valve projection region PV has a light valve geometric center C1 and has a first central axis E1 and a second central axis E2 perpendicular to each other, wherein the light valve geometric center C1 is the intersection point of the first central axis E1 and the second central axis E2. The first central axis E1 and the second central axis E2 are, for example, respectively parallel to the long side and the short side of the light valve 120. In particular, the light valve projection region PV is, for example, the orthographic projection region on the first surface S1 when the optical surface S4 of the light valve 120 is parallel to the first surface S1. An orthographic projection of the first opening O1 of the protection case 122 on the first surface S1 is a first projection region P1. Two second intersection points F21 and F22 are intersections between an outer contour of the second opening O2 of the absorption layer 130 disposed on the first surface S1 and the first central axis E1. Two first intersection points F11 and F12 are intersections between an outer contour of the first projection region P1 and the first central axis E1. The second intersection points F21 and F22 are located between the first intersection points F11 and F12. A third intersection point F23 is one of intersections between the outer contour of the second opening O2 and the second central axis E2. A fourth intersection point F13 is one of intersections between the outer contour of the first projection region P1 and the second central axis E2. The third intersection point F23 is located between the fourth intersection point F13 and the light valve geometric center C1 of the light valve projection region PV. In other words, distances between the orthographic projection of the first opening O1 on the first surface S1 in at least three of four opposite directions and the light valve geometric center C1 are all greater than a distance between the orthographic projection of the second opening O2 on the first surface S1 and the light valve geometric center C1. In this way, it can be ensured that the stray light reflected by an outer surface of the prism set 110 and the protection case 122 of the light valve 120 is absorbed by the absorption layer 130 to achieve a light shielding effect.

Figure 4:
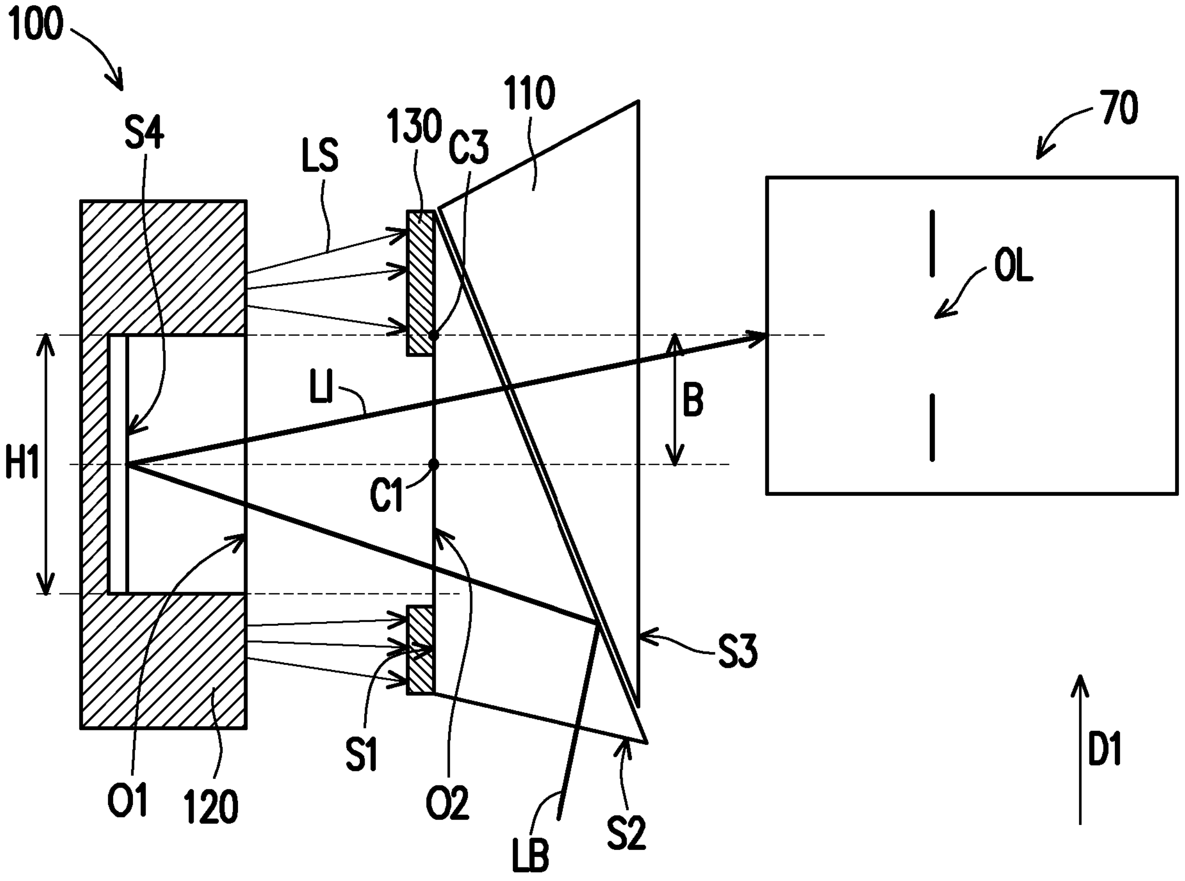
FIG. 4 is a schematic diagram of an optical engine module according to another embodiment of the disclosure.
Figure 5:
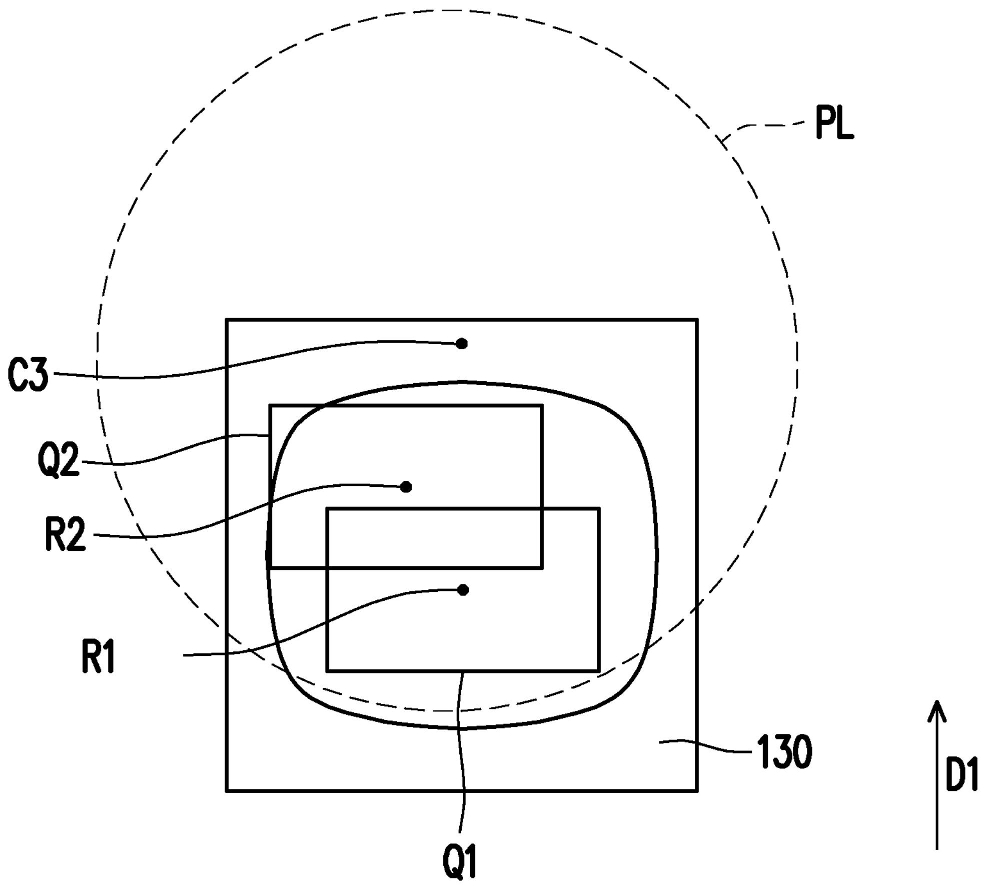
FIG. 5 is a schematic diagram of a light spot of each light beam on a first surface according to the embodiment of FIG. 4.

FIG. 4 is a schematic diagram of an optical engine module according to another embodiment of the disclosure. FIG. 5 is a schematic diagram of a light spot of each light beam on a first surface according to the embodiment of FIG. 4. Please refer to FIG. 4. An optical engine module 100A of the embodiment is similar to the optical engine module 100 shown in FIG. 2. The difference between the two is that the projection lens 70 and the optical engine module 100 of the embodiment of FIG. 2 are disposed on a common optical axis. In the embodiment, an inclinable angle of the optical surface S4 in the light valve 120 is relatively large, for example, 17 degrees, so an angle of the illumination beam LB incident on the light valve 120 must reach 34 degrees, so the absorption layer 130 needs to avoid an incident light path of the illumination beam LB. In order to prevent interference light rays from entering the projection lens 70 due to the avoidance of the absorption layer 130, the projection lens 70 and the optical engine module 100 of the embodiment are disposed off-axis (for example, in the embodiment, the setting position of the projection lens 70 is further from the center of the light valve 120 compared to the embodiment shown in FIG. 2). That is, there is a spacing B between a lens geometric center C3 of an orthographic projection region PL (shown in FIG. 5) of the aperture opening OL of the projection lens 70 on the first surface S1 and the light valve geometric center C1. Specifically, in the embodiment, the light valve 120 and the projection lens 70 satisfy the conditional expression: $1.15 \leq (D+H1)/H1 \leq 1.3$, where H1 is the width of the light valve projection region PV (when the optical surface S4 is parallel to the first surface S1) in a first direction D1, and D is the length of the spacing B between the lens geometric center C3 and the light valve geometric center C1. The first direction D1 is parallel to an arrangement direction of the lens geometric center C3 and the light valve geometric center C1. In this way, interference light rays can be prevented from entering the projection lens 70, which can greatly improve the display effect of an effective image area to improve the optical quality. Further, in the embodiment, a direction of the light valve geometric center C1 facing the geometric center of the second opening O2 is parallel to a direction of the light valve geometric center C1 facing the lens geometric center C3.

Please refer to FIG. 5. From the perspective of the first surface S1, an orthographic projection of the aperture opening OL of the projection lens 70 on the first surface S1 is the lens projection region PL with the lens geometric center C3, wherein the lens projection region PL referred to is a projection on a reference plane passing through (overlapping with) the first surface S1. The illumination beam LB from the illumination system 50 forms an incident light spot Q1 on the first surface S1, and the image beam LI from the light valve 120 forms an outgoing light spot Q2 on the first surface S1, wherein a center R2 of the outgoing light spot Q2 is located between the lens geometric center C3 and a center R1 of the incident light spot Q1.

Figure 6:
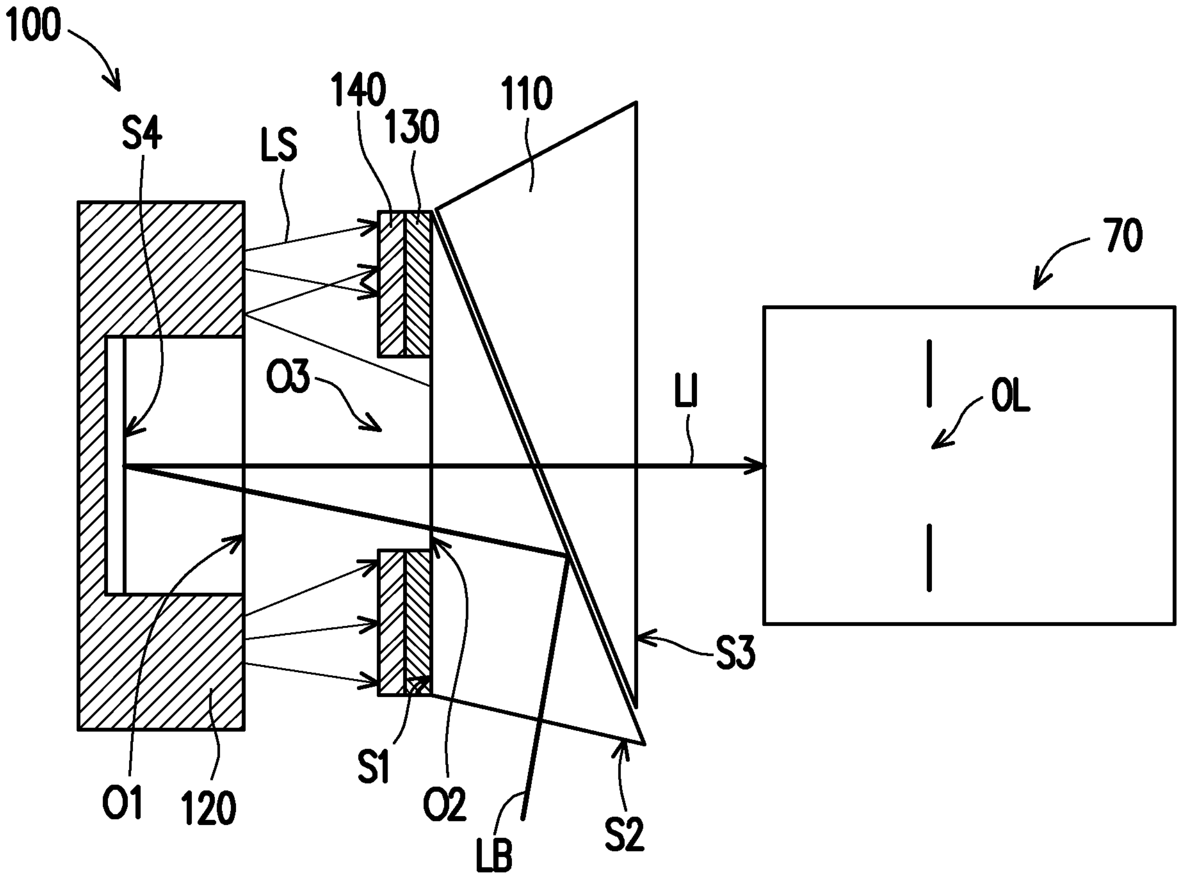
FIG. 6 is a schematic diagram of an absorption layer and a reflection layer according to an embodiment of the disclosure.

FIG. 6 is a schematic diagram of an absorption layer and a reflection layer according to an embodiment of the disclosure. Please refer to FIG. 6. In the embodiment shown in FIG. 2 and FIG. 4, the optical engine module 100 may further include a reflection layer 140 disposed on the absorption layer 130, wherein the absorption layer 130 is located between the reflection layer 140 and the prism set 110, the reflection layer 140 includes a third opening O3, and the third opening O3 completely overlaps with the second opening O2 of the absorption layer 130. The reflection layer 140 is, for example, aluminum (Al) or a combination of aluminum and silicon dioxide, or, for example, silicon dioxide ($SiO_2$), titanium dioxide ($TiO_2$), tantalum pentoxide ($Ta_2O_5$), or aluminum oxide ($Al_2O_3$), but the disclosure is not limited thereto. The reflectivity of the reflection layer 140 is more than 3 times the reflectivity of the absorption layer 130. For example, in the embodiment, the reflectivity of the reflection layer 140 is greater than 50%, and the reflectivity of the absorption layer 130 is less than 10%. In this way, the influence of high heat generated by the light beam on the absorption layer 130 can be reduced to prevent contact caused by the reduction of an air layer in the prism set 110, thereby preventing the reduction of brightness of an image or the generation of color spots.

Figure 7A:
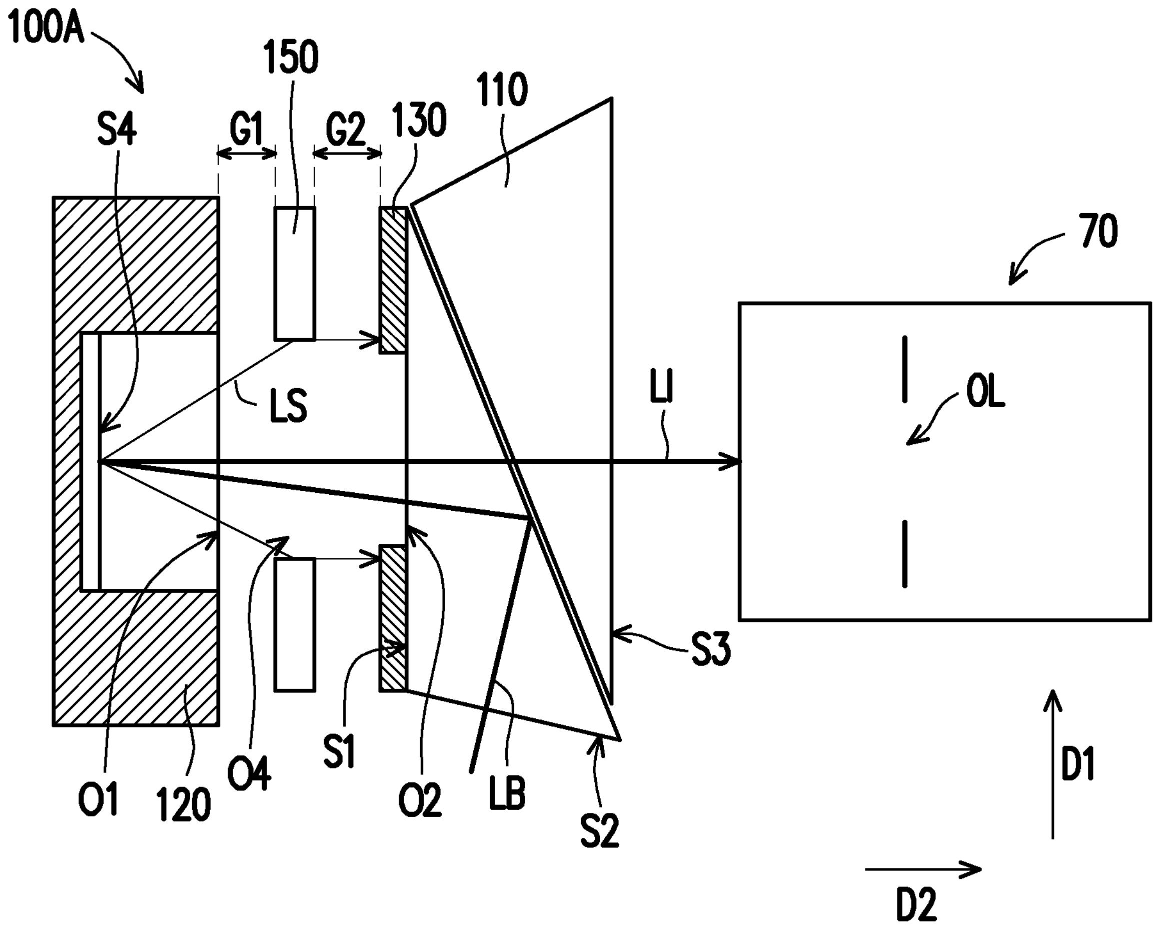
FIG. 7A is a schematic diagram of an optical engine module according to another embodiment of the disclosure.

FIG. 7A is a schematic diagram of an optical engine module according to another embodiment of the disclosure. Please refer to FIG. 7A. The optical engine module 100A of the embodiment is similar to the optical engine module 100 shown in FIG. 2. The difference between them is that in the embodiment, the optical engine module 100A further includes a light shielding element 150 disposed between the prism set 110 and the light valve 120. The light shielding element 150 has a fourth opening O4 overlapping with the second opening O2 in a second direction D2, wherein the second direction D2 is perpendicular to the first direction D1. There is a first interval G1 between the light shielding element 150 and the light valve 120, there is a second interval G2 between the light shielding element 150 and the absorption layer 130, the first interval G1 is less than the second interval G2, and the first interval G1 is greater than or equal to 0.05 mm and less than or equal to 0.2 mm. In this way, by further disposing the light shielding element 150, the stray light LS received by the protection case 122 of the light valve 120 can be reduced, thereby preventing the decrease in the optical effect caused by the temperature of the light valve 120 being too high. In particular, when the embodiment is applied to other embodiments in which the optical surface S4 of the light valve 120 has a larger inclinable angle, similar to the content disclosed in FIG. 4 above, the light valve 120 and the projection lens 70 may satisfy the conditional expression: $1.15 \leq (D+H1)/H1 \leq 1.3$, where H1 is the width of the light valve projection region PV (when the optical surface S4 is parallel to the first surface S1) in the first direction D1, and D is the length of the spacing between the lens geometric center and the light valve geometric center. The first direction D1 is parallel to the arrangement direction of the lens geometric center and the light valve geometric center.

Figure 7B:
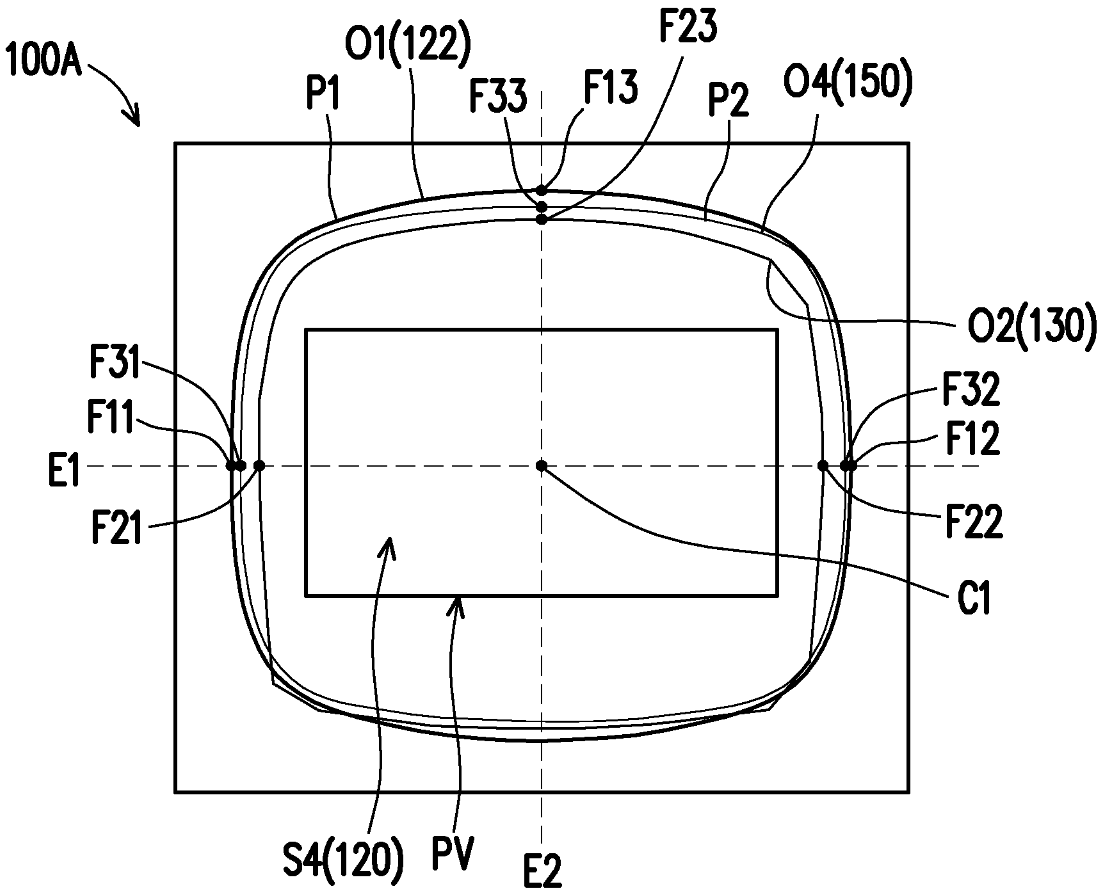
FIG. 7B is a schematic diagram of a projection of the optical engine module of FIG. 7A on a first surface.

FIG. 7B is a schematic diagram of a projection of the optical engine module of FIG. 7A on a first surface. Please refer to FIG. 7A and FIG. 7B. In the embodiment, an orthographic projection of the optical surface S4 of the light valve 120 on the first surface S1 is the light valve projection region PV, and the light valve projection region PV has the first central axis E1 and the second central axis E2 perpendicular to each other. The orthographic projection of the first opening O1 on the first surface S1 is the first projection region P1. An orthographic projection of the fourth opening O4 on the first surface S1 is a second projection region P2. The two second intersection points F21 and F22 are intersections between the outer contour of the second opening O2 and the first central axis E1. The two first intersection points F11 and F12 are intersections between the outer contour of the first projection region P1 and the first central axis E1. The second intersection points F21 and F22 are located between the first intersection points F11 and F12. The third intersection point F23 is one of the intersections between the outer contour of the second opening O2 and the second central axis E2. The fourth intersection point F13 is one of the intersections between the outer contour of the first projection region P1 and the second central axis E2. The third intersection point F23 is located between the fourth intersection point F13 and the light valve geometric center C1 of the light valve projection region PV. Two fifth intersection points F31 and F32 are intersections between an outer contour of the second projection region P2 and the first central axis E1. The second intersection points F21 and F22 are located between the fifth intersection points F31 and F32. A sixth intersection point F33 is one of intersections between the outer contour of the second projection region P2 and the second central axis E2. The third intersection point F23 is located between the sixth intersection point F33 and the light valve geometric center C1 of the light valve projection region PV. In other words, the distances between the orthographic projection of the first opening O1 on the first surface S1 in at least three of the four opposite directions and the light valve geometric center C1 are all greater than a distance between the orthographic projection of the fourth opening O4 on the first surface S1 and the light valve geometric center C1, and distances between the orthographic projection of the fourth opening O4 on the first surface S1 in at least three of the four opposite directions and the light valve geometric center C1 are all greater than the distance between the orthographic projection of the second opening O2 on the first surface S1 and the light valve geometric center C1. In this way, it can be ensured that the stray light LS reflected by the outer surface of the prism set 110 and the protection case 122 of the light valve 120 are absorbed by the absorption layer 130 to achieve a light shielding effect.

Figure 8:
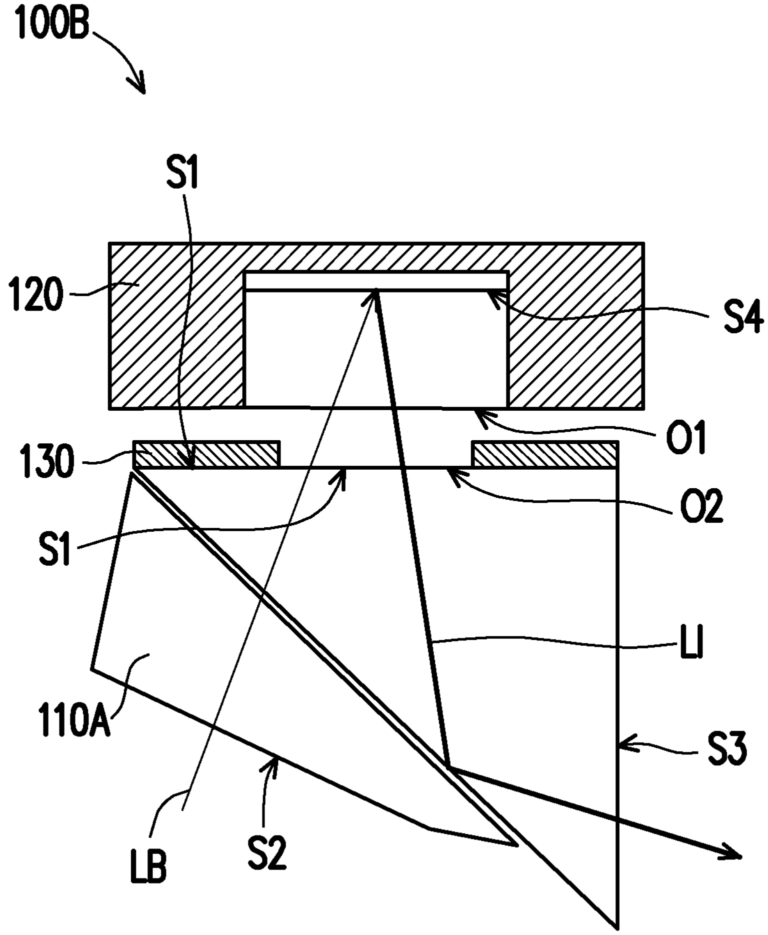
FIG. 8 is a schematic diagram of an optical engine module according to another embodiment of the disclosure.

FIG. 8 is a schematic diagram of an optical engine module according to another embodiment of the disclosure. Please refer to FIG. 8. Different from the above embodiments, a relaxed total internal reflection (RTIR) prism may also be chosen as a prism set 110A of an optical engine module 100B in the embodiment, so that by disposing the absorption layer 130 on the first surface S1 of the prism set 110A, the image beam LI is transmitted through the first opening O1 and the second opening O2 of the absorption layer 130 from the light valve 120 to enter the prism set 110A. Therefore, the image beam LI from the light valve 120 can only be transmitted through the second opening O2 of the absorption layer 130, and the stray light LS reflected by the outer surface of the prism set 110A and the protection case 122 of the light valve 120 are absorbed by the absorption layer 130 to achieve a light shielding effect. In this way, the display effect of the effective image area can be greatly improved to improve the optical quality.

Figure 9:
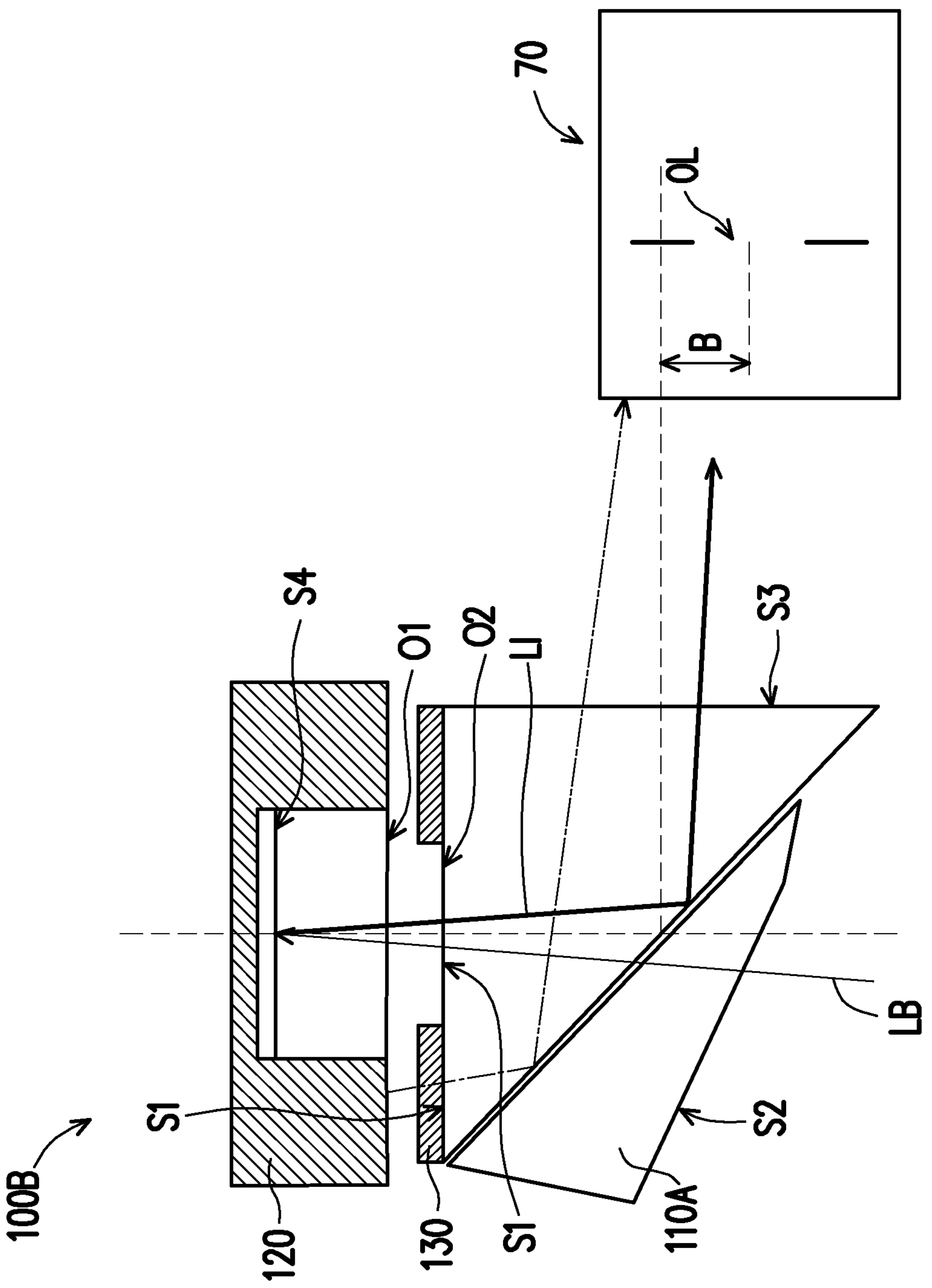
FIG. 9 is a schematic diagram of an optical engine module according to another embodiment of the disclosure.

FIG. 9 is a schematic diagram of an optical engine module according to another embodiment of the disclosure. Please refer to FIG. 9. The optical engine module 100B of the embodiment is similar to the optical engine module 100B shown in FIG. 8. The difference between the two is that similar to the embodiment of FIG. 4, in the embodiment, in order to prevent interference light rays from entering the projection lens 70, the projection lens 70 and the optical engine module 100B may be disposed off-axis. That is, in the embodiment, the setting position of the projection lens 70 is displaced by the spacing B (such as being displaced along a direction parallel to the third surface S3 and away from the light valve 120) compared to the embodiment of FIG. 8. In this way, interference light rays can be prevented from entering the projection lens 70, and the display effect of the effective image area can be greatly improved to improve the optical quality.

In summary, in the optical engine module and the projection device of the disclosure, the absorption layer is disposed on the first surface of the prism set at the spacing from the light valve, and the absorption layer includes the second opening, wherein the area of the second opening is less than the area of the first opening. The illumination beam is transmitted into the prism set by the illumination system and is reflected by the prism set to pass through the first opening of the light valve to be converted into the image beam. The image beam is transmitted through the second opening of the absorption layer by the light valve from the first opening to enter the prism set. Therefore, the image beam from the light valve can only be transmitted through the second opening of the absorption layer, and stray light reflected by the outer surface of the prism set and the protection case of the light valve are absorbed by the absorption layer to achieve a light shielding effect. In this way, the display effect of the effective image area can be greatly improved to improve the optical quality.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term “the invention”, “the disclosure” or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An optical engine module, comprising a prism set, a light valve, an absorption layer, and a light shielding element, wherein:

the prism set has a first surface;

the light valve is disposed on a side of the first surface of the prism set, the light valve comprises a protection case and an optical surface, the protection case comprises a first opening, and the optical surface is exposed from the first opening;

the absorption layer is disposed on the first surface of the prism set, the absorption layer comprises a second opening; and the light shielding element is disposed between the absorption layer and the protection case, the light shielding element comprises an opening, wherein in a first direction, the opening of the light shielding element comprises a first length, and the second opening comprises a second length, the first length is longer than the second length, and the first direction is perpendicular to a normal direction of the optical surface.

2. The optical engine module according to claim 1, further comprising a reflection layer disposed on the absorption layer, wherein the absorption layer is located between the reflection layer and the prism set, the reflection layer comprises a third opening, and the third opening completely overlaps with the second opening.

3. The optical engine module according to claim 2, wherein a reflectivity of the reflection layer is more than 3 times a reflectivity of the absorption layer.

4. The optical engine module according to claim 1, wherein an orthographic projection of the optical surface of the light valve on the first surface is a light valve projection region having a first central axis and a second central axis perpendicular to each other, and an orthographic projection of the first opening on the first surface is a first projection region, wherein two first intersection points are intersections between an outer contour of the first projection region and the first central axis, two second intersection points are intersections between an outer contour of the second opening and the first central axis, the two second intersection points are located between the two first intersection points, a third intersection point is one of intersections between the outer contour of the second opening and the second central axis, a fourth intersection point is one of intersections between the outer contour of the first projection region and the second central axis, and the third intersection point is located between the fourth intersection point and a light valve geometric center of the light valve projection region.

5. The optical engine module according to claim 1, wherein there is a first interval between the light shielding element and the light valve, there is a second interval between the light shielding element and the absorption layer, the first interval is less than the second interval, and the first interval is greater than or equal to 0.05 mm and less than or equal to 0.2 mm.

6. The optical engine module according to claim 1, wherein an orthographic projection of the optical surface of the light valve on the first surface is a light valve projection region having a first central axis and a second central axis perpendicular to each other, an orthographic projection of the first opening on the first surface is a first projection region, and an orthographic projection of the opening of the light shielding element on the first surface is a second projection region, wherein two first intersection points are intersections between an outer contour of the first projection region and the first central axis, two second intersection points are intersections between an outer contour of the second opening and the first central axis, the two second intersection points are located between the two first intersection points, a third intersection point is one of intersections between the outer contour of the second opening and the second central axis, a fourth intersection point is one of intersections between the outer contour of the first projection region and the second central axis, and the third intersection point is located between the fourth intersection point and a light valve geometric center of the light valve projection region, two fifth intersection points are intersections between the outer contour of the second projection region and the first central axis and the second intersection points are located between the two fifth intersection points, a sixth intersection point is one of intersections between the outer contour of the second projection region and the second central axis, and the third intersection point is located between the sixth intersection point and the light valve geometric center of the light valve projection region.

7. A projection device, comprising an illumination system, an optical engine module, and a projection lens, wherein:

the illumination system is used to provide an illumination beam;

the optical engine module is disposed on a transmission path of the illumination beam and is used to convert the illumination beam into an image beam, and the optical engine module comprises a prism set, a light valve, an absorption layer, and a light shielding element, wherein:

the prism set has a first surface;

the light valve is disposed on a side of the first surface of the prism set, the light valve comprises a protection case and an optical surface, the protection case comprises a first opening, and the optical surface is exposed from the first opening; and the absorption layer is disposed on the first surface of the prism set, and the absorption layer comprises a second opening; and the light shielding element is disposed between the absorption layer and the protection case, the light shielding element comprises an opening, wherein in a first direction, the opening of the light shielding element comprises a first length, and the second opening comprises a second length, the first length is longer than the second length, and the first direction is perpendicular to a normal direction of the optical surface; and the projection lens is disposed on a transmission path of the image beam and is used to project the image beam out of the projection device.

8. The projection device according to claim 7, wherein the prism set also has a second surface and a third surface, the illumination beam from the illumination system enters the prism set from the second surface and leaves the prism set from the first surface, the image beam from the light valve enters the prism set from the first surface and leaves the prism set from the third surface.

9. The projection device according to claim 7, wherein the projection lens and the prism set of the optical engine module are disposed off-axis.

10. The projection device according to claim 7, wherein the projection lens has an aperture opening, an orthographic projection of the aperture opening on the first surface is a lens projection region having a lens geometric center, the second opening has a second opening geometric center, and an orthographic projection of the optical surface of the light valve on the first surface is a light valve projection region having a light valve geometric center, wherein the light valve geometric center is located between the lens geometric center and the second opening geometric center.

11. The projection device according to claim 10, wherein the light valve and the projection lens satisfy a conditional expression: $1.15 \leq (D+H1)/H1 \leq 1.3$, where H1 is a width of the light valve projection region in a first direction, D is a spacing between the lens geometric center and the light valve geometric center, and the first direction is parallel to an arrangement direction of the lens geometric center and the light valve geometric center.

* * * * *